(12) United States Patent
Thomas

(10) Patent No.: US 7,712,724 B2
(45) Date of Patent: May 11, 2010

(54) DYNAMIC BALL VALVE SEALING DEVICE FOR THREE-WAY VALVES

(75) Inventor: Kurt R. Thomas, Durand, IL (US)

(73) Assignee: TAC, LLC, Loves Park, IL (US)

(*) Notice: Subject to any disclaimer, the term of this patent is extended or adjusted under 35 U.S.C. 154(b) by 509 days.

(21) Appl. No.: 11/766,611

(22) Filed: Jun. 21, 2007

(65) Prior Publication Data
US 2008/0315144 A1 Dec. 25, 2008

(51) Int. Cl.
F16K 5/00 (2006.01)
(52) U.S. Cl. ............. 251/314; 251/315.01; 137/602; 137/625.41; 137/625.46
(58) Field of Classification Search ........... 251/315.01, 251/315.16, 314, 359; 137/625, 625.4, 625.41, 137/625.46, 602
See application file for complete search history.

(56) References Cited

U.S. PATENT DOCUMENTS

| | | | |
|---|---|---|---|
| 3,795,384 A | 3/1974 | Reddy | |
| 3,960,363 A | 6/1976 | Domyan | |
| 3,985,334 A | 10/1976 | Domyan | |
| 4,111,393 A | 9/1978 | McClurg et al. | |
| 4,173,234 A | 11/1979 | Thomas et al. | |
| 4,318,420 A * | 3/1982 | Calvert | 137/74 |
| 4,388,945 A | 6/1983 | Johnson et al. | |
| 4,390,039 A | 6/1983 | Johnson et al. | |
| 4,410,165 A | 10/1983 | Koch et al. | |
| 4,477,055 A | 10/1984 | Partridge | |
| 4,566,482 A * | 1/1986 | Stunkard | 137/315.21 |
| 4,566,672 A | 1/1986 | Giebeler | |
| 4,602,762 A | 7/1986 | Koch et al. | |
| 4,676,480 A * | 6/1987 | Garceau et al. | 251/159 |
| 4,718,444 A | 1/1988 | Boelte | |
| 4,815,701 A | 3/1989 | Stone | |
| 4,911,408 A | 3/1990 | Kemp | |
| 5,494,256 A | 2/1996 | Beson | |
| 6,401,754 B1 | 6/2002 | Winquist et al. | |
| 6,681,793 B2 | 1/2004 | Mike | |
| 7,448,410 B2 * | 11/2008 | Keiser | 137/625.47 |
| 7,587,824 B2 * | 9/2009 | Pervaiz et al. | 29/890.121 |

FOREIGN PATENT DOCUMENTS

EP 0 763 680 A1 3/1997

* cited by examiner

Primary Examiner—John K Fristoe, Jr.
(74) Attorney, Agent, or Firm—Reinhart Boerner Van Deuren P.C.

(57) ABSTRACT

A ball valve having improved sealing between the valve member and the valve body is presented. Improved sealing is realized by providing a sealing member that is allowed to float on the outer surface of the valve member in the closed position. By being able to float on the outer surface, the sealing member can compensate for any variations in the valve member as a result of machining tolerances or variations in position of the valve member due to changes in pressure within the valve, thereby providing dynamic sealing The dynamic sealing is also provided by configuring the valve member such that it causes the sealing member to be exposed to a higher biasing force in the closed position than in the open position.

17 Claims, 4 Drawing Sheets

DYNAMIC BALL VALVE SEALING DEVICE FOR THREE-WAY VALVES

FIELD OF THE INVENTION

This invention generally relates to ball valves and more particularly relates to an apparatus and method for dynamically sealing the valve member of a ball valve.

BACKGROUND OF THE INVENTION

Ball valves typically include a valve body that includes a plurality of ports typically ranging between two ports and four ports. A valve member within the valve body, depending on its orientation within the valve body, selectively directs fluid between selected ones of the various ports or may entirely stop fluid flow through the valve body. As such, ball valves include seals interposed between the various ports and the valve member to prevent fluid from bypassing the valve member, i.e. leaking around the valve member and circumventing the desired fluid flow configuration.

Unfortunately, due to machining tolerances of the valve member and valve body, it has been difficult to ideally place and size fixed position seals for perfect, leak-free, seal-off. Further, merely using a seal that is oversized and compressing it within the valve body to compensate for the variations in tolerances can impart large loads on the valve member that make it more difficult to rotate the valve member. These large loads can require larger, more powerful actuators to position the valve member, leading to more costly actuators and more costly operation.

Compounding the problem of using fixed position seals is the fact that the pressure differential across a given port can vary depending on the flow direction of the fluid through the port or valve member. The changes in pressure can cause the walls of the valve member to flex or cause the valve member to move within the valve body. Fluid flow in one direction may move the seal and valve member out of sealing contact, while fluid flow in another direction may move the seal and valve member into sealing contact. As such, depending on the fluid flow and pressure differential, a fixed position seal may or may not provide adequate leak-free sealing between the valve member and valve body.

There exists, therefore, a need in the art for an improved ball valve and sealing configuration that overcomes these and other problems existing in the art. The apparatus and method of the present invention provides such a ball valve and dynamic sealing configuration.

BRIEF SUMMARY OF THE INVENTION

Embodiments of the present invention provide an apparatus and method for improving the seal between a valve member of a ball valve and the valve body. Embodiments of the improved seal are provided by a seal member between the valve member and valve body that compensate for variations in the components of the valve due to machining tolerances. Embodiments of the improved seal member compensate for flexure in the valve member or changes in position in the valve member as a result of variation in pressure within the valve body that often result from changes in fluid flow. Still more particularly, embodiments of the present invention use the seal member to provide dynamic sealing with the valve member and/or with the valve body. In this way the position of the seal member relative to the valve body can vary while the seal member remains in sealing contact with the valve member regardless of the position and variations in machining of the components.

One embodiment of the present invention provides a valve that includes a seal member that interacts with a valve member and a valve body of the valve. Preferably, the seal member is permitted to move within and/or relative to the valve body. In a closed position, the seal member sealingly contacts the valve body and sealingly contacts the valve member to prevent fluid flow through the port. Preferably, the seal member extends a first depth into a valve chamber housing the valve member in an open position, and in the closed position the seal member extends a second depth, less than the first depth, into the valve chamber. More particularly, the valve member biases the seal member in a direction out of the valve chamber as it is transitioned from the open position to the closed position.

In an embodiment, the valve member includes a through passage having through passage openings therethrough to direct fluid flow depending on the orientation of the valve member. Preferably, the through passage openings have a larger diameter than the diameter of the end of the seal member that contacts the valve member. In such an embodiment, the seal member is permitted to penetrate a void in the valve member formed by the through passage in the outer surface of the valve member. As the valve member is transitioned from the open position to the closed position, the valve member preferably biases the seal member out of the void. This preferably causes the seal member to compress a biasing member to provide dynamic sealing of the seal member against the valve member. Thus, any fluctuation in the position of the valve member is compensated by dynamic positioning of the biased seal member. In a further embodiment, voids are provided by a non-circular or non-spherical shape of the valve member such that the seal member need not be smaller in diameter than the through passage openings.

In yet another embodiment, an improved method of sealing off a valve port of a valve body using a seal member is provided. By pivoting a valve member from an open position to a closed position, the valve biases the seal member from a first position wherein the seal member is a first distance away from an axis of rotation to a second position wherein the seal member is a second distance away from the axis of rotation, the second distance being greater than the first distance. This biasing positions the seal member relative to the valve member. The method preferably includes biasing the seal member against an imperforate portion of an outer surface of the valve member in the second position. In an embodiment, the seal member is biased against and compresses a biasing member acting to force the seal member towards the valve member.

These and other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
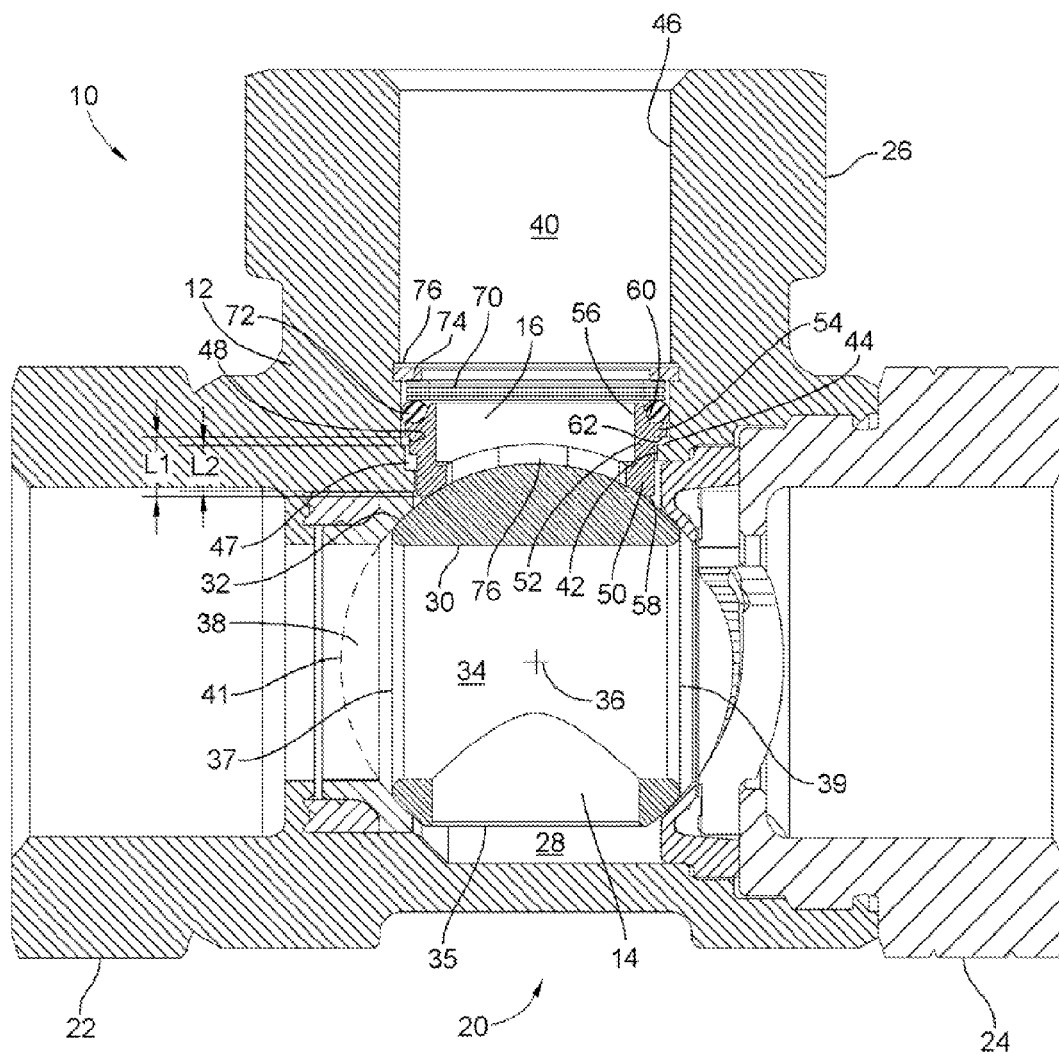
FIG. 1 is a cross-section of a first exemplary embodiment of a ball valve having dynamic sealing, according to one embodiment of the present invention, in a closed position.

FIG. 1 illustrates a cross-section of an exemplary embodiment of a ball valve 10, according to the teachings of the invention. The ball valve 10 includes a valve body 12 and a valve member 14 operatively connected to the valve body 12 by a dynamic seal member 16.

The valve body 12 of the illustrated embodiment is a three-way ball valve. However, the teachings of the present invention may be used in practicing other valves such as two-way, four-way, etc. ball valves. The valve body 12, as illustrated, includes a central portion 20, a pair of in-line ports 22, 24 and a transverse port 26. The ports 22-26 extend outward from the central portion 20 with the transverse port 26 extending at an angle, illustrated at ninety-degrees, relative to the pair of in-line ports 22, 24. The valve body 12 may be formed unitarily or from separate components threaded or otherwise connected together. The combination of the ports 22-26 and central portion defines a "T-shaped" flow passage through the valve body 12 in the illustrated embodiment. The central portion 20 defines a valve chamber 28 formed at the intersection of the flow ports 22-26.

The valve member 14 is disposed within the valve chamber 28. The valve member 14 of the exemplary embodiment has an outer wall 30 defining a generally spherical shaped outer surface 32 and defining through passage 34 therein. In the illustrated embodiment the through passage is "T-shaped" and includes three openings 35, 37, 39. The openings 35, 37, 39 are formed at the intersection of the through passage 34 with the outer surface 32 of the valve member 14. However, other shapes such as, e.g., an "L-shaped" through passage could be used in practicing embodiments of a valve according to the invention depending on the application or type of valve.

The valve member 14 includes voids proximate through passage openings 35, 37, 39. The voids are provided by deviations in the outer surface 32 of the valve member 14. For example, void 38 is defined between the plane defined by the intersection of through passage opening 37 and outer surface 32 and an imaginary surface 41 of the valve member if the valve member were entirely spherical and did not include the through passage openings 35, 37, 39.

Figure 2:
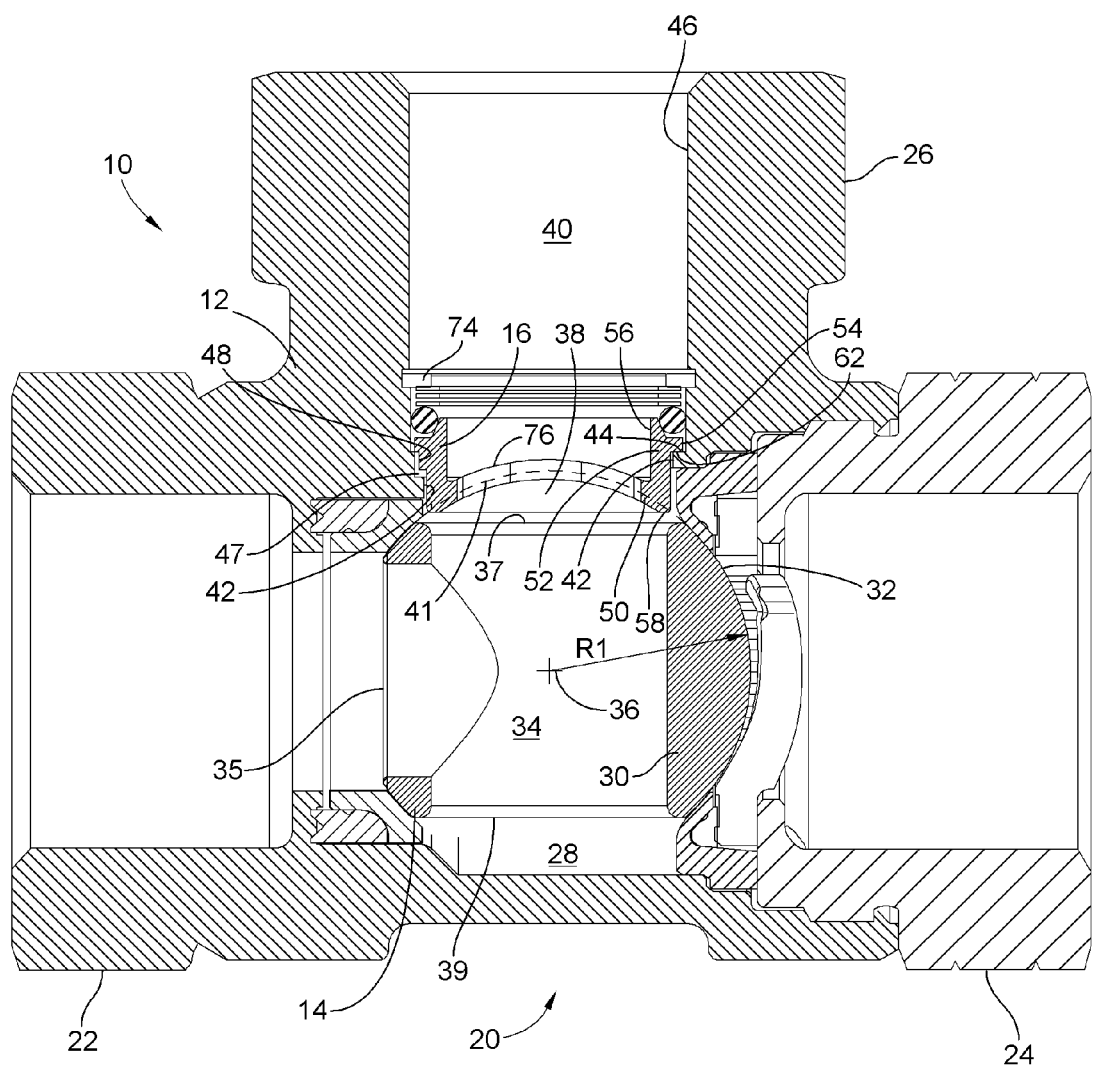
FIG. 2 is a cross-section of a the ball valve of FIG. 1 in an open position.

The valve member 14 is selectively rotatable within the valve chamber 28 about axis 36 (axis 36 extends perpendicular to the page and is illustrated by an "X") between open positions, such as illustrated in FIG. 2, and closed positions, such as illustrated in FIG. 1. In the open position, the through passage 34 of the valve member 14 aligns in an in-fluid-communication alignment with the transverse port 26 and at least one of the in-line ports 22, 24 of the valve body 12. In this orientation the transverse port 26 and at least one in-line ports 22, 24 are in fluid communication via the through passage 34. In the closed position, the through passage 34 is in an out-of-fluid-communication alignment with the transverse port 26, thereby blocking fluid flow through the transverse port 26. More particularly, the transverse port 26 and dynamic seal member 16 aligns with an imperforate portion of the surface 32 of the valve member 14.

With reference to FIG. 1, in an exemplary embodiment of the valve body 12, the transverse port 26 includes an outer bore 40 and a communication passage 42. The communication passage 42 is interposed between and fluidly communicates the outer bore 40 and the valve chamber 28. In the illustrated embodiment, the outer bore 40 has a larger diameter than the communication passage 42. Thus, the inner surface 46 of the transverse port 26 forms a radially extending shoulder 44 that forms a radially inward transition between the outer bore 40 and the communication passage 42. However, in alternative embodiments, transverse port could have a substantially continuous diameter and be free of the radially extending shoulder 44.

In the illustrated embodiment, the communication passage 42 includes an alignment slot 47 that receives an alignment tab 48 of the dynamic seal member 16. The alignment slot 47 interacts with the alignment tab 48 of the dynamic seal member 16 to prevent rotation of the dynamic seal member 16 within the transverse port 26. However, where preventing rotation of the dynamic seal member 16 is not needed, alternative embodiments do not require alignment slots or alignment tabs.

In the closed position, dynamic seal member 16 operatively connects the valve member 14 to the valve body 12, and more particularly the transverse port 26. In the exemplary embodiment, the dynamic seal member 16 is slidingly carried in the transverse port 26, such that it floats therein and can move either inward toward the valve chamber 28 or outward away from the valve chamber 28. This floating configuration facilitates a dynamic sealing between the dynamic seal member 16 and the valve member 14.

The dynamic seal member 16 includes a valve member end 50, an extension portion 52, an abutment flange 54, and a back end 56. The valve member end 50 is at an opposed end of the dynamic seal member 16 as the back end 56. As illustrated the valve member end 50 is a contoured and transitions into the extension portion 52. In the illustrated embodiment, the surface 58 of the valve member end 50 is rounded to facilitate transitioning the valve member 14 from an open position to a closed position as will be more fully explained below. The abutment flange 54 is interposed between the extension portion 52 and back portion 56 and extends radially outward beyond the extension portion 52. The back portion 56 includes a ramped back surface 60.

The outer diameter of the extension portion 52 corresponds to the inner diameter of the communication passage 42. Further, the length L1 of the portion of the dynamic seal member 16 extending from an abutment surface 62 of the abutment flange 54 to the valve member end 50 is greater than the length L2 of the longest portion of the communication passage 42, defined between the outer bore 40 and the valve chamber 28. As such, the dynamic seal member 16 can be positioned "too-deep" such that the valve member end 50 extends axially beyond the communication passage 42 and into the valve chamber 28.

With reference to FIG. 2, the valve member 14 is in an open position such that the through passage 34 of the valve member fluidly communicates in-line port 22 with the transverse port 26. In this position, the valve member end 50 of the dynamic seal member 16 is aligned with opening 37 of through passage 34 and opening 35 is aligned with in-line port 22. In this position, the dynamic seal member 16 is biased as deeply into the valve chamber 28 as possible such that the abutment surface 62 of the abutment flange 54 abuts with the radial shoulder 44 forming the transition between the outer bore 40 and communication passage 42. In the open position, the dynamic seal member 16 is allowed to extend a maximum distance into the valve chamber 28.

Because the through passage 34 of the valve member 14 intersects the outer surface 32, the valve member 14 is not a full sphere and includes voids such as void 38, as discussed previously. The imaginary periphery 41 is positioned a distance R1 away from the axis 36 of the valve member 14. Because the diameter of the opening 37 is greater than the diameter of the valve member end 50 of the dynamic seal member 16, the dynamic seal member 16 passes into the valve chamber 28 and penetrates the imaginary periphery 41 of the valve member 14 and into void 38. If the dynamic seal member 16 had a larger diameter than the opening 37, the dynamic seal member 16 would contact outer surface 32 of the valve member 14 and would not penetrate the void 38 in the sphere created by opening 37.

Spring 70 biases the dynamic seal member 16 into the valve chamber 28 and against shoulder 44, such that the valve member end 50 passes into the void 38 defined by the imaginary periphery 41 of the valve member 14. The spring 70 is interposed between and acts on an auxiliary seal member in the form of o-ring 72 that abuts the back end 56 of the dynamic seal member 16, more particularly ramped surface 60, and a retainer in the form of snap ring 74. The spring 70 may be provided by, for example, a coil spring, rubber spring or a wave spring, etc. that provides a resilient biasing force.

The snap ring 74 mounts in groove 76 formed in the inner surface 46 of outer bore 40. As the snap ring 74 is a retainer, the snap ring 74 secures the spring 70, o-ring 72, and dynamic seal member 16 within the transverse port 26. Further, the inner surface 46 of the outer bore 40 may include a plurality of grooves for varying the position of the snap ring 74 to vary the amount of compression of spring 70 and, therefore, its biasing force it applies to o-ring 72. Alternatively, the snap ring 74 could be replaced with a retainer that is continuously adjustable within the transverse port 26, such as an externally threaded annular ring that mates with an internally threaded portion of inner surface 46, or an abutment should formed in the outer bore 40.

In this embodiment, the dynamic seal member 16 does not contact the valve member 14 in the open position, which is illustrated in FIG. 2 by the gap between surface 58 of the dynamic seal member 16 and the surface of valve member 14 that defines through passage opening 37. The dynamic seal member 16 is prevented from contacting the valve member 14 because of the interference between radially extending shoulder 44 and abutment flange 54. In the open position, there is no need for the dynamic seal member 16 to make a seal with, and therefore contact, the valve member 14 because it is desired to have fluid flow through the transverse port 26 and bypass the dynamic seal member 16. However, in other embodiments, the dynamic seal member 16 may contact or be permitted to contact the valve member 14 in the open position.

Having the dynamic seal member 16 out of contact with the valve member 14 in the open position is a significant advantage over other prior art valves where all three seals of the three ports 22-26 of the valve 10 remain in contact the valve member 14. In the open position, in-line port 24 is closed off by the imperforate portion of the outer wall 30 of the valve member 14. In this configuration, the fluid flowing through the through passage 34 of the valve member 14 provides a large pressure differential across the seal located in in-line port 24 causing high static friction between that seal and the outer surface 32 of the valve member 14.

By having the dynamic seal member 16 out of contact of the valve member 14, the valve member 14 is not exposed to static friction with the dynamic seal member 16. As such, an actuator (not shown) that drives the valve member 14 between the open position (FIG. 2) and the closed position (FIG. 1) does not have to overcome additional static frictional forces applied to the valve member 14 by the dynamic seal member 16. This reduces the torque requirements of the actuator because the actuator need only initially over come the static friction applied by the seal located in in-line port 24. Once the actuator begins to actuate the valve member 14 between open and closed positions, the friction becomes kinetic friction which is lower than static friction and the added friction applied to the valve member 14 by the seal member 16 is less significant in opposing actuation of the valve member.

FIG. 1 illustrates the valve member 14 in the closed position. The valve member 14 is oriented such that the transverse port 26 does not aligned with any openings 35, 37, 39, but rather aligns with the imperforate portion of the outer surface 32 of the valve member 14 extending between openings 37 and 39. Also, the dynamic seal member 16 cooperates with o-ring 72, the valve member 14 and the valve body 12 to prevent fluid from passing from the valve chamber 28 through the transverse port. In other words, the valve member is a "seal-off" position such that the transverse port 26 is sealed off from or out-of-fluid-communication with the rest of the flow ports 22, 24.

In the closed position, spring 70 biases the dynamic seal member 16 into the valve chamber 28 and into contact with the outer surface 32 valve member 14. This creates a seal between the valve member 14 and the dynamic seal member 16 to prevent any fluid in the valve chamber 28 from passing through the opening 76 through the dynamic seal member 16. In addition, the o-ring 72 provides a seal between the outer surface, particularly ramped surface 60, of the dynamic seal member 16 and the inner surface 46 of the outer bore 40. This seal prevents fluid from passing through the transverse port 26 exteriorly of the dynamic seal member 16. As such, fluid flow may not pass through the transverse port 26.

The spring 70 acts on the o-ring 72, rather than the dynamic seal member 16, to bias the dynamic seal member 16 towards the valve member 14 and into the valve chamber 28. By acting on o-ring 72, the spring biases o-ring 72 towards the ramp surfaced 60 of the dynamic seal member 16. Thus, as the spring 70 is increasingly compressed, the o-ring 72 is exposed to an increased force pushing the o-ring 72 up ramped surface 60 and increasingly wedged between the ramped surface 60 and the inner surface 46, thereby increasing the sealing force of the o-ring therebetween.

By having the dynamic seal member 16 biased by spring 70, the dynamic seal member 16 is permitted to float within the transverse port 26 rather than being in a fixed position relative to the valve body 12 and valve member 14. As such, any fluctuation in the position of the valve member 14 or valve member wall 30 due to variations in pressure drop across the valve member 14 or variations in the valve member 14, valve body 12 or dynamic seal member 16 as a result of manufacturing tolerances that could provide an improper seat between the dynamic seal member 16 and the valve member 14 are substantially negated. More particularly, the dynamic seal member 16 floats within the transverse port 26 to adjust its position and compensate for any such variations.

Additionally, the force at which the dynamic sealing member contacts the outer surface 32 of the valve member 14 can be easily and efficiently tailored depending on the application as compared to a fixed position seal. In a fixed position seal, the material properties of the seal member or different sized seal members would have to be manufactured. In embodiments of the present invention, merely swapping the spring 70 with a different spring having a different spring constant can very the biasing force. Alternatively a different length spring could be used. Further, as discussed previously, the valve 10 could be provided with an adjustable stop member rather than the fixed position snap ring 74.

Figure 3:
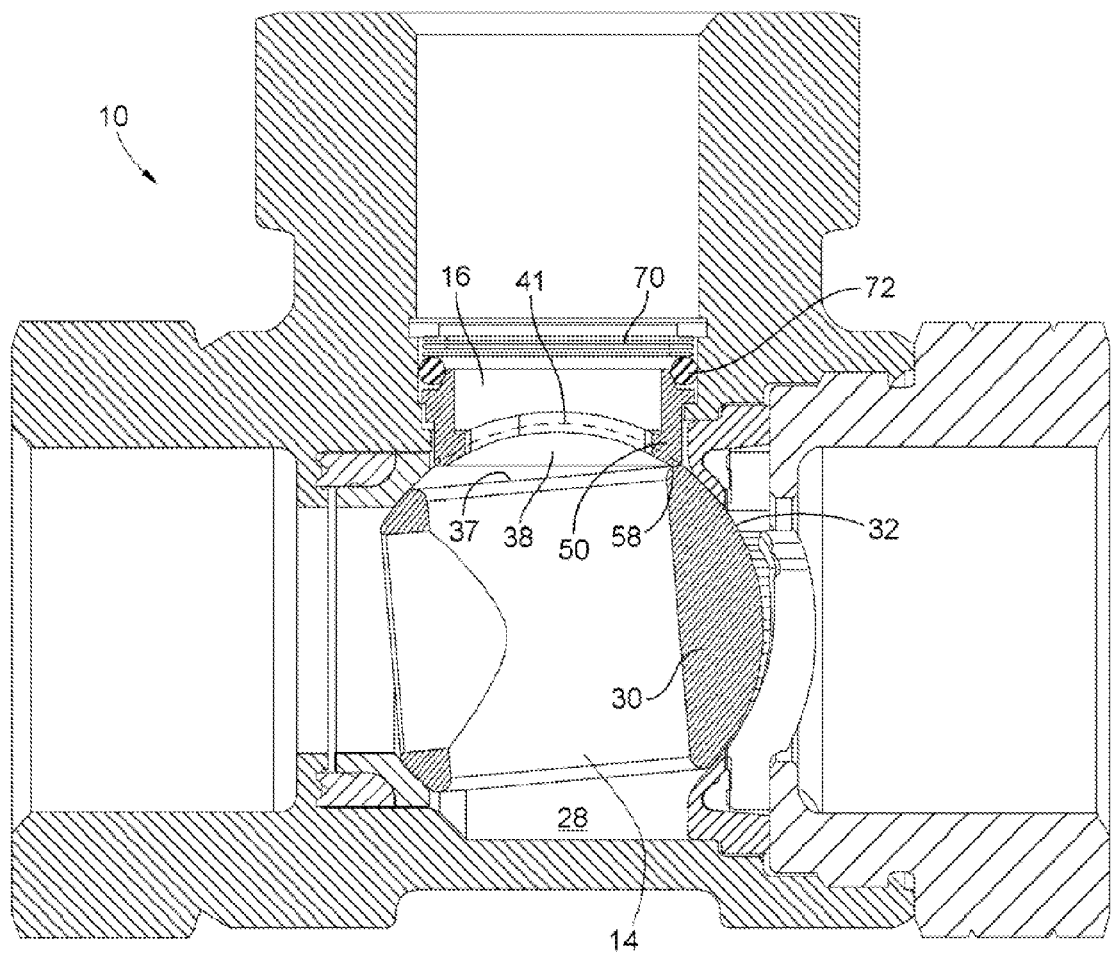
FIG. 3 is a cross-section of a the ball valve of FIG. 1 transitioning from an open position to a closed position.

With further reference to FIG. 3, as the valve member 14 rotates from the open position (see FIG. 2) to the closed position (see FIG. 1), the valve member 14 contacts the valve member end 50 of the dynamic seal member 16, which is positioned within the void 38 created by opening 37. As the valve member 14 continues to rotate to the open position, the dynamic seal member 16 rides up on the outer surface 32 of the valve member 14. As the dynamic seal member 16 rides up on the outer surface 32, the dynamic seal member 16 is biased and pushed out of the void and out of the valve chamber 28, compressing spring 70. By biasing the dynamic seal member 16 outward and up on to the outer surface 32, the dynamic seal member 16 is permitted to float as it is pressed against the outer surface 32 as discussed previously to negate any variations in the size or position of the valve member 14.

As illustrated, both the surface 50 of the valve member end 50 and the opening 37 are contoured, more particularly rounded. The contouring facilitates the dynamic seal member 16 to ride up on the outer surface 32 of the valve member 14 and to prevent the valve member 14 from damaging the dynamic seal member 16. It is preferred that both surface 50 and the surface of the valve member 14 be contoured.

Figure 4:
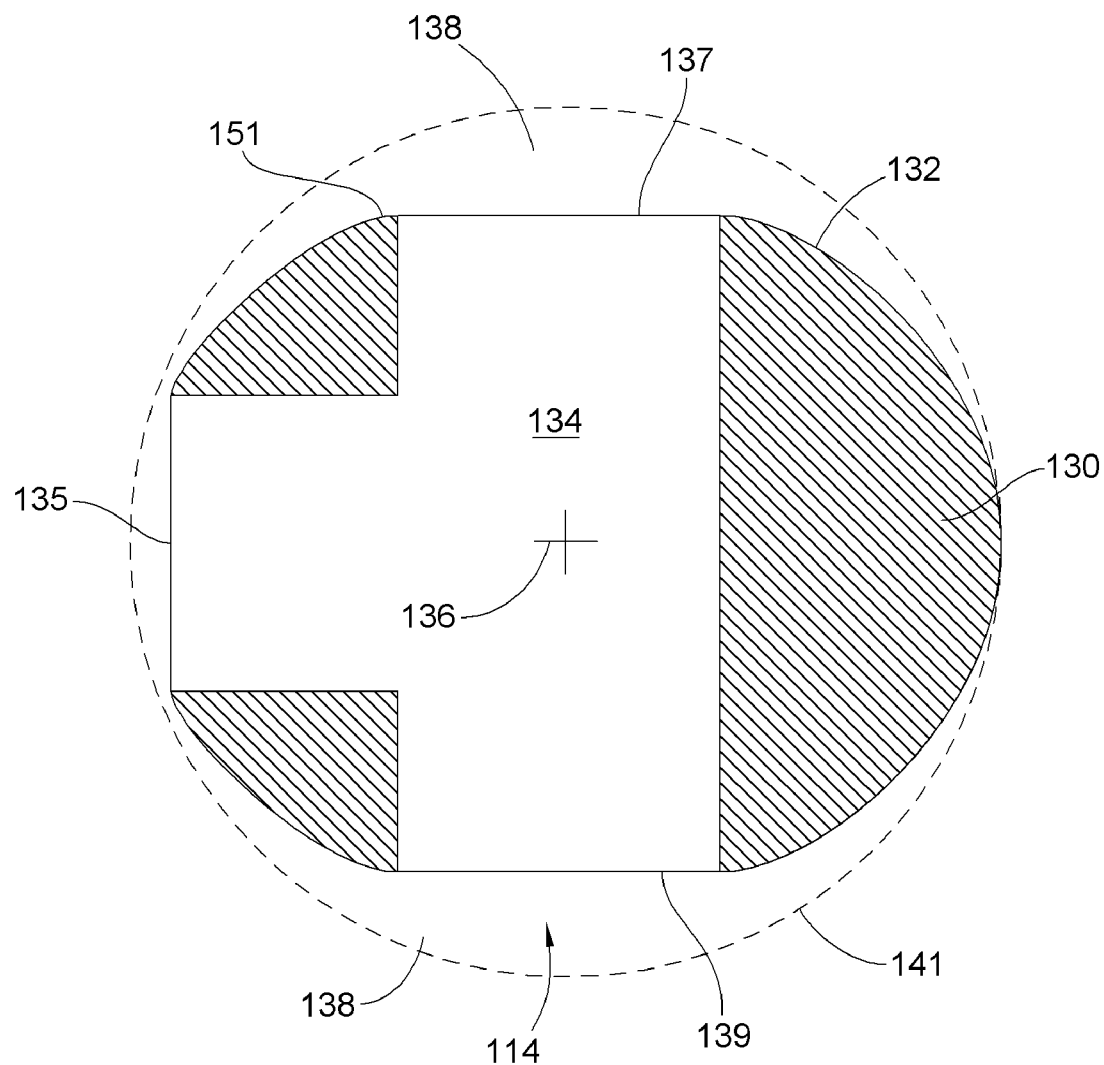
FIG. 4 is a cross-section of another embodiment of a valve member according to the teachings of the present invention.

While the illustrated embodiment incorporates a generally spherical valve member 14 (except for the voids created by openings 35, 36, 37), other shaped valve members may be used in practicing the invention. For example, FIG. 4 illustrates an alternative valve member 114 that has a non-circular cross-section. The valve member 114 includes a wall 130, that defines an outer surface 132 that is generally elliptical. The valve member defines through passage 134 that includes openings 135, 137, 139 and pivots between open and closed positions about axis 136. The elliptical cross-section has a major axis which is generally aligned with opening 135 and a minor axis which is aligned with openings 137 and 139. The major and minor axis are generally perpendicular to each other as well as to axis 136.

Alternatively, the cross-section could be oval or other shapes. In this embodiment, the diameter of a dynamic sealing member (not shown) need not be smaller than the diameter of the openings 135, 137, or 139. In such an embodiment, the non-circular cross-section of the valve member 114 will in and of itself provide deviations in the valve member 114. As such, the major and minor axes cause the outer surface 132 to not be continuously rotation symmetric about axis 136 and thus creates voids, such as void 138 formed between an imaginary circular or spherical surface 141, illustrated in dashed lines, and the outer surface 132. These voids 138 formed by the transition of the valve member 114 from a minor axis portion to a major axis portion, such as proximate transition 151, allow a dynamic sealing member to be positioned in the valve chamber deeper in the open position than in the closed position so that the dynamic seal operates as discussed previously with reference to valve member 14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ball valve comprising:
    a valve body defining a flow passage having a plurality of flow ports and a valve chamber therein between;
    a valve member disposed within the valve chamber and having a through passage therein defining through passage openings, the valve member selectively movable within the valve chamber between an open position and a closed position, the open position providing an in-fluid-communication alignment of the through passage with a first flow port of the plurality of flow ports and at least another one of the plurality of flow ports, and the closed position providing an out-of-fluid-communication alignment of the through passage with the first flow port for blocking flow between the first port and the through passage;
    a seal including a seal member carried by the valve body in sealing contact with the first port, the seal member having, in the open position, a first end substantially aligned with a first one of the through passage openings and positioned a first distance from an axis of rotation of the valve member, and in the closed position, the seal member is aligned with and in sealing contact with a seal-off portion of the surface of the valve member and positioned a second distance from the axis of rotation, the second distance being greater than the first distance; and
    a spring member biasing the dynamic seal member toward the valve member.

2. The ball valve of claim 1, wherein the seal-off portion of the surface of the valve member is imperforate.

3. The ball valve of claim 2, wherein the geometry of the valve member is configured such that voids are formed by deviations of the valve member from having a continuously rotation symmetric outer surface about the axis of rotation.

4. The ball valve of claim 3, wherein the surface of the valve member is generally spherical and the voids are defined by deviations in the spherical shape defined by the through passage openings intersecting the outer surface.

5. The ball valve of claim 4, wherein a diameter of a valve member end of the seal member is smaller than a diameter of at least one of the through passage openings.

6. The ball valve of claim 3, wherein the valve member end of the seal member penetrates one of the voids in the open position.

7. The ball valve of claim 3, wherein at least one void is formed by the valve member having an outer surface that surrounds the axis of rotation of the valve member that generally has minor and major axes, the voids being formed proximate the minor axis and at least one of the through passage openings is formed proximate a minor axis of the valve member.

8. The ball valve of claim 1, wherein the first flow port is substantially perpendicular to a second flow port of the plurality of flow ports.

9. The ball valve of claim 1, wherein the spring member is interposed between a retainer and the seal member.

10. The ball valve of claim 9, wherein the position of the retainer is variable.

11. The ball valve of claim 1, wherein the seal member is slidingly carried in the first port, and a valve chamber end of the seal member extends into the valve chamber.

12. The ball valve of claim 11, wherein the seal includes an auxiliary seal member, and the seal member includes a ramped back surface, the auxiliary seal interposed between the ramped back surface and the spring member and forming a seal between an inner surface of the first port and the ramped back surface.

13. The ball valve of claim 12, wherein the auxiliary seal member is an o-ring, and the spring member acts directly on the o-ring and thereby on the seal member, the o-ring being increasingly wedged between the ramped back surface and the inner surface of the first port to increase a sealing pressure on the inner surface of the first flow port and ramped back surface as the biasing force provided by the spring member increases.

14. The ball valve of claim 12, wherein the tapered back surface and the valve chamber end define opposite ends of the seal member, the seal member further includes an extension portion and a radial flange, the extension portion adjacent to and transitioning into the valve chamber end, the flange being interposed between the extension portion and the tapered back surface and extending outward beyond the extension portion, and the first flow port of the valve body includes a first bore having a first diameter and a second bore adjacent to the first bore having a second diameter, smaller than the first, the adjacent bores defining a shoulder, the second bore connecting the first bore with the valve chamber, at least part of the extension portion of the seal member slidingly carried in the second bore and being longer in length than the second bore.

15. The ball valve of claim 1, wherein transitioning the valve member from the open position to the closed position causes the spring member to provide a larger biasing force in the closed position than in the open position.

16. The ball valve of claim 1, wherein at least one of an outer surface of the seal member and an inner surface of the through passage openings includes a tapered region, the tapered region adapted assist biasing the seal member while transitioning the valve member from the open position to the closed position.

17. The ball valve of claim 1, wherein the seal member is out of contact with the valve member in the open position.

* * * * *